US006758566B2

United States Patent
Goulden et al.

(10) Patent No.: US 6,758,566 B2
(45) Date of Patent: Jul. 6, 2004

(54) PROJECTION SYSTEM

(75) Inventors: Lorna Goulden, Amsterdam (NL); Paul Denis McGroary, Eindhoven (NL); Fiona Rees, Eindhoven (NL); Alex Wee Kar Tan, Eindhoven (NL); Joanna Martina Cornelia Van Gestel, Eindhoven (NL); Philip Phelan, London (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 76 days.

(21) Appl. No.: 10/023,160

(22) Filed: Dec. 18, 2001

(65) Prior Publication Data

US 2002/0105620 A1 Aug. 8, 2002

(30) Foreign Application Priority Data

Dec. 19, 2000 (EP) .............................................. 00204619

(51) Int. Cl.$^7$ ............................................. G03B 21/14
(52) U.S. Cl. ......................................... 353/79; 353/122
(58) Field of Search ................................... 353/79, 122

(56) References Cited

U.S. PATENT DOCUMENTS

| 4,285,028 A | * | 8/1981 | Sundin et al. | ................. 362/35 |
| 4,955,714 A | * | 9/1990 | Stotler et al. | ................. 353/62 |
| 5,260,919 A | * | 11/1993 | Tsai | ........................... 368/223 |
| 6,146,146 A | | 11/2000 | Koby-Olson | ................. 434/159 |

FOREIGN PATENT DOCUMENTS

| DE | 20004679 U | 9/2000 | ........... G03B/21/00 |
| WO | WO9744775 | 11/1997 | ............ G09G/5/00 |
| WO | WO0156269 | 2/2001 | ............ H04N/5/00 |

* cited by examiner

Primary Examiner—William C. Dowling
(74) Attorney, Agent, or Firm—Gregory L. Thorne

(57) ABSTRACT

Projection systems are known to display images of all kind. The invention proposes to use of a ceiling of a room, for example the bedroom can be used to display all kind of images. Further the invention makes the projection system very much user-interactive.

8 Claims, 2 Drawing Sheets

PROJECTION SYSTEM

The invention relates to a projection system. The invention also relates to a method to project images.

Projection systems are known in the art to display images of all kinds.

One of the objects of the invention is to provide a projection system, which has more possibilities and which can have more user interactivity possibilities.

To this end a projection system according to the invention provides the features of claim 1. The invention is based on the insight that the ceiling can be perfectly used as a projection screen. For example in a bedroom the ceiling space is a natural receptor for the gaze whilst a person lies in bed. Could an enrichment of the ceiling's image, via projection, enhance the activities of rest, reflection, imagination and creative pro-activity within the bedroom? In order to stimulate rest and reflection using projections, the content has to be chosen carefully. For example is it possible that the images could evolve gradually over time, changing according to the time you view it, the time of the year or the nature of activity in bed. A further insight is that nowadays users want to be in control of the apparatuses they use and with the projection system according to the invention these possibilities are given.

Embodiments of the invention comprise the features as described in the dependent claims.

Figure 1:
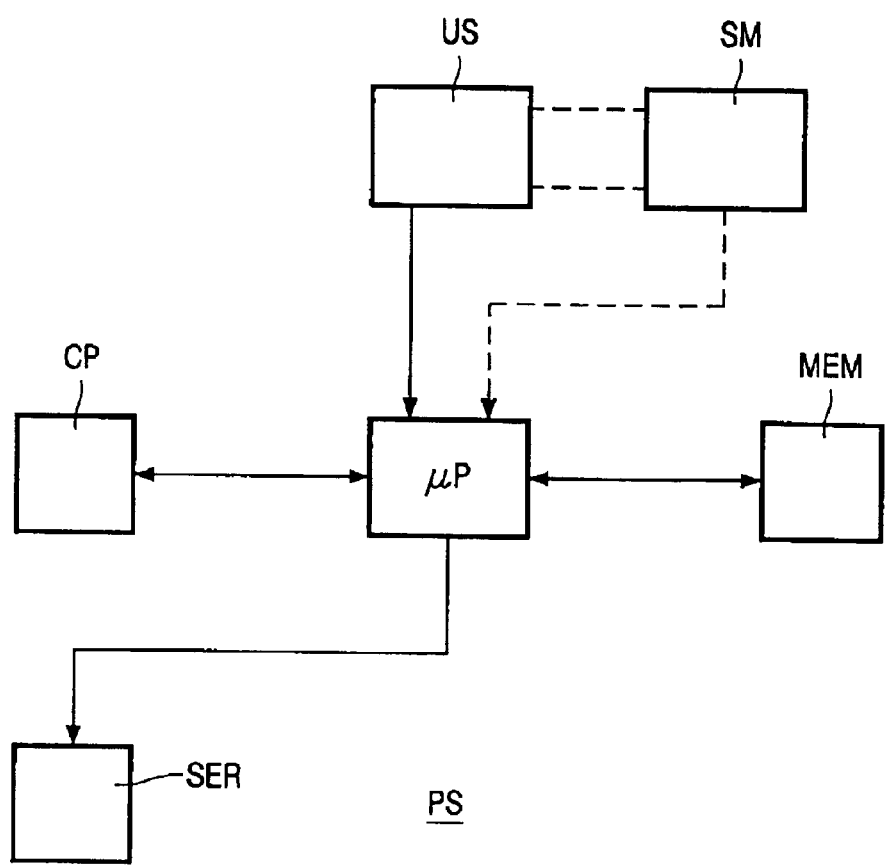
Figure 2:
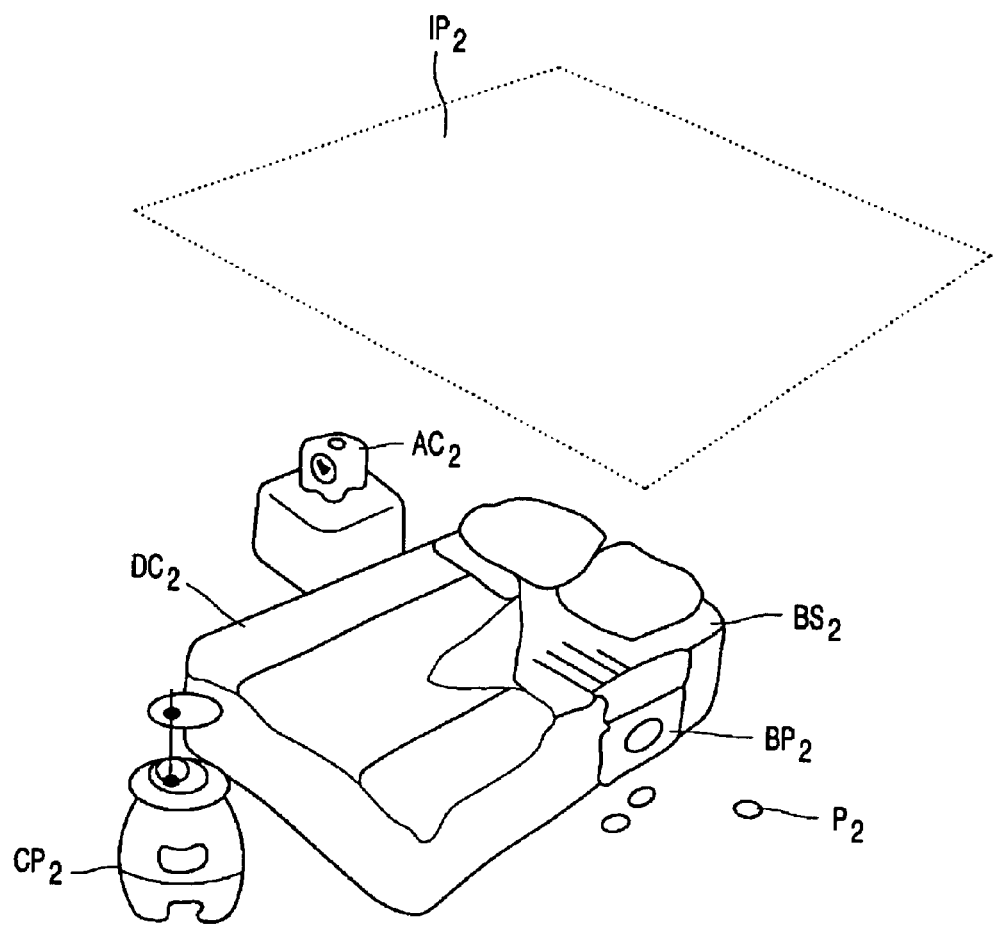

The invention will be described herein after by way of example of the following description. Herein shows:

FIG. 1 a schematic example of a projection system according to the invention, and FIG. 2 a practical example of a projection system of FIG. 1.

FIG. 1 shows an example of an interactive projection system PS according to the invention. The interactive projection system comprises a ceiling projector CP, a microprocessor uP, a memory MEM, a user-interface UI and sensor means SEN.

The ceiling projector CP can be placed for example in a bedroom at the foot of a bed and can project images onto the ceiling. The ceiling projector can show images from a microprocessor uP and memory MEM of content to which it is linked. Further it is possible that the projection system is coupled via a server SER to the internet. The projector and the nature of the Images it projects, are controlled using the user-interface UI and sensor means for example with a bedside pocket and pebbles, the conductive bedsheet and duvet cover and the alarm clock as explained later.

See FIG. 2 for a practical figure of a projection system according to the invention (reference items in relation with FIG. 2 have an extension "2".

The user interface can for example be embodied in the form of a Bedside Pocket BP2 and so-called Pebbles P2 (see FIG. 2): The user switches the system on and off by touching a printed button on the side of the bedside pocket BP2. When the system is on, the nature of content shown on the ceiling can be determined by selecting a pebble P2 and placing it into the bedside pocket. To change the content type, the user simply swaps pebbles.

Further the sensor means can for example be a Conductive Bedsheet BS2: Content projected onto the ceiling can be manipulated using the bedsheet. The bedsheets are printed with conductive ink so that when the person in bed changes their resting position, the images on the ceiling evolve. Similarly, if two people are in bed and they touch, again the images transform.

Further the sensor means can for example comprise Conductive Duvet Cover DC2: Each pebble conceals a hidden game. When two people lie in a particular position in bed, the game appears on the ceiling. From that point on, the game will be activated whenever the couple grabs onto the top of the duvet. The game can be played by tugging the duvet from side to side.

Another element of the projection system PS can be an Alarm Clock AC2: The alarm clock enables the user to incorporate their own messages and drawings into the projections and to see how long they have left to sleep before their alarm goes off.

When the alarm clock is set and the system is on standby, the projection system can project two dots on opposite sides of the ceiling. During the night, the distance between the dots decreases representing the decreasing time before the alarm goes off. If someone has put a note under the clock the night before, a snapshot of the note will be projected onto the ceiling when the two dots meet at the set alarm time.

An example of the Bedsheets BS2 and Duvet Cover DC2 are described below. The bedsheets were printed with lines of conductive ink in the shape of a broken circuit. A series of metal poppers were attached to the lines of ink and wired to the computer. Consequently, when the skin of the user spans two or more lines of ink, it completes the printed circuit. This circuit completion triggers a command which tells the computer (via a Director script) to change the nature of the projected image. The bedsheet was printed and wired so that six different sleeping positions would bring about a potential of six variations to a pebble's content type. The duvet cover was also printed with conductive ink but, due to time restrictions, was not wired to the system.

An example of the Bedside Pocket BP2 and Pebbles P2 are described hereinafter.

As with the bedsheets, the system on/off button on the exterior of the bedside pocket was printed using conductive ink and wired, using poppers, to the computer. The interior of the pocket was fitted with a reader who was also wired to the computer. Each pebble was formed around a transponder programmed to 'bookmark' a certain projection type. Consequently, when a pebble is put into the bedside pocket, the pocket reads the transponder and tells the projector, via the computer, to project a certain projection type.

An example of the Projector CP2 and Projected Animated Graphics IP2 comprises the following:

The projector can utilize parts of an existing LCD projector and a fresnel lens to enable an enlarged projection area on the ceiling.

An example of the Alarm Clock AC2 comprises the following:

The interior of the alarm clock was fitted with a small bulb and a miniature video camera. The camera and alarm setting button were then connected to the computer (microprocessor uP). The set up was programmed so that when the alarm goes off, the camera takes a picture of the note placed under the clock and send via the computer, to the projector CP.

During the night, a ceiling projection could be used to give an indication of time. It is for example possible rather than telling you exact time at any one point, it would tell you, for example, pictorially, how long you have left to sleep before your alarm goes off. The projected image could move around the room or get bigger during the night. Alternatively, it could perhaps reflect the phases of the moon (real time). The clock projection could also serve as a night light for use during the night. The on/off button for the light could be on the duvet DC2.

It will be noticed that above the invention has been described on the basis of an example but that within the scope of the invention a lot of alternatives are possible.

During story telling to a child the projections could be an aid for storytelling. The images of the bedtime could be projected onto the ceiling whilst or maybe after the story is told.

Another possibility is to use this projection system PS by a person reading a book whereby the images projected on the ceiling could come from a chip inside the book or a magazine. For example by placing the book or magazine under the bed or under the pillow, the transponder would be activated and a projection relating to the book or magazine, shown on the ceiling.

A further possibility is to play games when a couple or a single person lies in bed. Adding games to the projection system provides the user with a more active way to engage with the projections. The trigger to play could lead to conversation, education or other kinds of fun. The game could encourage creativity and could be energizing or relaxing. Providing games that require two players could help to create intimacy and bonding through enabling shared fun.

An other option could be to create the possibility that when two people get into bed at different times, the first person in bed could leave a message for the other by projecting a note onto the ceiling. The image would be projected within a 'soft spot', of low light intensity, so as not to wake the already sleeping partner.

To make the projected images more unpredictable the unconscious control of imagery could happen in various ways. For example could the projection system register the sleeping positions of the persons in bed and keep a record of their movements over time. This pattern could then be used to dictate the pattern of images shown, via a kind of algorithm.

Various mechanisms could be used to turn the projection system on/off. For example with a manual on/off button on the duvet cover DC2. Another method could be an auto off option. The projection system shuts itself down after a preset amount of time by using time pebbles P2. The time pebbles would have a transponder to tell the projection system to shut down after the given time on the pebble P2. The time frame options could for example be 5, 10, 15 minutes, represented by for example either one, two or three dots depicted on the pebble's surfaces.

The examples described above all refer to a bedroom. Of course it is also possible to use the interactive projection system according to the invention in other rooms.

What is claimed is:

1. Interactive projection system comprising a ceiling projecting means for projecting images, micro-processing means for processing information, memory means for storing the information and user interface means for interfacing with a user, wherein the user-interface means comprise a bedside pocket.

2. Interactive projection system as claimed in claim 1, characterized in that the micro-processor means are coupled to a server for receiving information from the internet.

3. Interactive projection system as claimed in claim 1 characterized in that the ceiling projector comprises a LCD projector with a fresnel lens.

4. Interactive projection system as claimed in claim 1, characterized in that the user-interface means comprise means to display written notes.

5. Interactive projection system comprising a ceiling projecting means for projecting images, micro-processing means for processing information, memory means for storing the information and user interface means for interfacing with a user wherein the user-interface means comprise a duvet cover having printed conductive ink.

6. Interactive projection system comprising a ceiling projecting means for projecting images, micro-processing means for processing information, memory means for storing the information and user interface means for interfacing with a user, wherein the user-interactive means comprise a bedsheet having printed conductive ink.

7. Method of interactively projecting images on a ceiling having a step of receiving information, recording the information, and displaying the information in dependence of an interaction of a user with a user-interface in the form of at least one of a bedside pocket, a duvet cover having printed conductive ink, and a bedsheet having printed conductive ink.

8. The method of claim 7, wherein the interaction of the user comprises at least one of inserting a pebble into the bedside pocket, pulling on the duvet cover, and changing position in relation to the bed sheet.

* * * * *